(12) United States Patent
Ellis

(10) Patent No.: US 12,161,074 B2
(45) Date of Patent: Dec. 10, 2024

(54) POTTING APPARATUS AND METHOD

(71) Applicant: Carlos Mitchell Ellis, Semmes, AL (US)

(72) Inventor: Carlos Mitchell Ellis, Semmes, AL (US)

( * ) Notice: Subject to any disclaimer, the term of this patent is extended or adjusted under 35 U.S.C. 154(b) by 1134 days.

(21) Appl. No.: 16/926,987

(22) Filed: Jul. 13, 2020

(65) Prior Publication Data

US 2021/0007290 A1 Jan. 14, 2021

Related U.S. Application Data

(60) Provisional application No. 62/873,865, filed on Jul. 13, 2019.

(51) Int. Cl.
*A01G 9/08* (2006.01)

(52) U.S. Cl.
CPC ............. *A01G 9/081* (2013.01); *A01G 9/083* (2013.01); *A01G 9/088* (2013.01)

(58) Field of Classification Search
CPC .......... A01G 9/081; A01G 9/08; A01G 9/083; A01G 9/085; A01G 9/086; A01G 9/088; A01C 5/04; A01C 11/02; A01C 11/006; A01C 11/00; B65G 47/61
USPC ................................................ 47/1.01 P, 901
See application file for complete search history.

(56) References Cited

U.S. PATENT DOCUMENTS

| | | | | | |
|---|---|---|---|---|---|
| 2,604,690 | A | * | 7/1952 | Rodder | B23D 21/00 82/71 |
| 3,524,419 | A | * | 8/1970 | Gibson | A01C 11/02 111/926 |
| 3,657,839 | A | * | 4/1972 | Krause | A01G 9/088 47/1.01 R |
| 5,641,008 | A | * | 6/1997 | Ellis | A01G 9/081 141/129 |
| 2003/0070352 | A1 | * | 4/2003 | Ellis | A01G 9/083 47/1.01 P |
| 2012/0285580 | A1 | * | 11/2012 | Ellis | A01G 9/081 141/1 |

* cited by examiner

*Primary Examiner* — Brady W Frazier
*Assistant Examiner* — Nicole Paige MacCrate
(74) *Attorney, Agent, or Firm* — AdamsIP, LLC; Stephen Thompson; J. Hunter Adams

(57) ABSTRACT

Embodiments of the present disclosure relate to a potting apparatus, which includes a drill that is repositionable relative to a pot-driving conveyor such that the potting apparatus may be placed in a first potting configuration or a second potting configuration. In the first potting configuration, the drill is in a first position relative to the pot-driving conveyor such that the apparatus can provide the requisite drilling functionality for potting plant life with smaller vertical profiles. In the second potting configuration, the drill is in a second position relative to the pot-driving conveyor to provide sufficient vertical clearance above the pot-driving conveyor for potting plant life with larger vertical profiles. The potting apparatus may further include a soil delivery system adapted to receive and dispense soil to the pot-driving conveyor and a drive system operatively connected to the pot-driving conveyor.

20 Claims, 12 Drawing Sheets

POTTING APPARATUS AND METHOD

CROSS-REFERENCE TO RELATED APPLICATIONS

This application claims priority to U.S. Provisional Patent Application Ser. No. 62/873,865, entitled "POTTING APPARATUS AND METHOD", filed on Jul. 13, 2019, the entirety of which is incorporated herein by reference.

FIELD OF THE DISCLOSURE

The present disclosure relates generally to machines and processes which assist in plant potting operations. More specifically, embodiments of the present disclosure relate to a potting apparatus that provides the drilling functionality and vertical clearance necessary for potting plants of variable height.

BACKGROUND

Horticultural growers often grow and sell a variety of plant life and have a need to periodically place growing plants (e.g., seedlings, shrubs, flowers, trees, and the like) in pots of sufficient size to accommodate future growth or to otherwise prepare such plants for sale. Plants with larger vertical profiles, such as trees which extend several feet above their receiving pots, can often be potted simply by placing the base of the plant within a receiving pot and covering the plant's root system with soil, sometimes referred to as "bareroot potting." Plants with smaller vertical profiles, however, often lack sufficient height or root structure to be potted in the same manner as plants with larger vertical profiles. Rather, many plants with smaller vertical profiles, such as flowers, often require a hole first be established within the soil of a soil-filled pot and the plant's root system be placed within the established hole for proper potting. Commonly, the potting hole is established by way of drill-based potting, wherein a drill bit is lowered into and subsequently out of a soil-filled pot. Accordingly, the techniques and potting environment required to properly pot plant life may depend, at least in part, on the plant life's height.

Although a variety of potting machines designed to assist horticultural growers pot plant life are known within the art, such machines generally fail to provide the requisite features and functionality necessary to accommodate the potting of plant life of variable height. Rather, known potting machines are generally designed to accommodate either plant life with smaller vertical profiles or larger vertical profiles, but not both. Known potting machines designed to assist in the potting of plant life with larger vertical profiles are generally devoid of any drilling functionality and are therefore incapable of establishing the requisite hole within a soil-filled pot necessary for potting plant life with smaller vertical profiles. Conversely, known potting machines designed to assist in the potting of plant life with smaller vertical profiles, such as that disclosed in U.S. Pat. No. 8,590,583, lack the vertical clearance necessary to permit plant life having larger vertical profiles, such as trees, to travel from the loading end to the discharge end of the machine's pot driving conveyor without toppling over due the machine's drilling apparatus or other structural components being disposed in a fixed position above the machine's pot-driving conveyor. Because known potting machines are incapable of accommodating plant life with small vertical profiles as well as plant life with large vertical profiles, horticultural growers are forced to purchase multiple potting machines to satisfy their potting needs. As these potting machines often cost thousands of dollars, the foregoing disadvantages of known potting machines result in significant additional overhead for horticultural growing operations.

Accordingly, a need exists for improved apparatuses and methods that address the above-described disadvantages.

SUMMARY

Embodiments of the present disclosure relate to a potting apparatus, which includes a drill that is repositionable relative to a pot-driving conveyor such that the potting apparatus may be placed in either a "drilling" mode potting configuration or a "bareroot mode" potting configuration. In the drilling mode, the drill is in a first position relative to the pot-driving conveyor that enables the apparatus to provide the requisite drilling functionality for potting plant life with smaller vertical profiles. In bareroot mode, the drill is in a second position relative to the pot-receiving conveyor that provides sufficient vertical clearance above the pot-driving conveyor for bareroot potting plant life with larger vertical profiles. The potting apparatus includes a first conveyor suitable for receiving and driving pots thereon, a soil delivery system that includes a second conveyor for receiving and dispensing soil, a drill, and a drive system operatively connected to the first conveyor for moving the first conveyor. The soil delivery system is positioned relative to the first conveyor such that soil dispensed from the second conveyor is directed onto the first conveyor or into pots disposed on the first conveyor. The drill is movably positioned relative to the first conveyor such that the drill may be transitioned from the first position where the drill is disposed above the first conveyor and a second position where the drill is not disposed above the first conveyor.

The drill is positioned downstream of a dispensing end of the second conveyor and can, while in the first position, be moved upwardly and downwardly relative to the first conveyor by action of a motor to drill a hole within the soil of a soil-filled pot located on the first conveyor. In some embodiments, the drive system responsible for movement of the first conveyor may be adapted to move the conveyor in an indexing manner such that the first conveyor temporarily stops at a location directly below the drill when the drill is in the first position. To accommodate plant life with larger vertical profiles, the drill can be placed in the second position to provide additional clearance above the first conveyor. In some embodiments, the drill may be movably positioned relative to the first conveyor by virtue of the drill being rotatably secured to the first conveyor or the soil delivery system. In an embodiment, the drill may be carried by a housing, which, in turn, is rotatably secured to the soil delivery system such that the housing is rotatable about a horizontal plane above the first conveyor. By transitioning the drill between the first and second position, the potting apparatus of the present disclosure can be easily adjusted to accommodate plants with both smaller and larger vertical profiles, thereby alleviating the need for multiple potting machines.

To permit the filling of pots loaded with plant life having larger vertical profiles extending several feet above its receiving pot, such as trees, the soil delivery system may, in some embodiments, be positioned as to not extend across the entirety of the first conveyor. In an embodiment, the soil delivery system extends over only a portion of the first conveyor that is less than the first conveyor's total width. In one embodiment, the soil delivery system may extend over a portion of the first conveyor that is equal to half or less than half of the first conveyor's width. To collect excess or misdelivered soil and redirect the same to the second conveyor for recirculation, the soil delivery system may further include a bin disposed beneath the first conveyor and an auger disposed within the bin to move soil collected within the bin towards the second conveyor. To permit passage of soil moved by the auger to the second conveyor, the bin includes an opening within one of its sidewalls.

In some embodiments, the potting apparatus may further comprise an actuator operatively connected to at least one of the first conveyor and the second conveyor to permit users to selectively move pots loaded on the first conveyor and/or selectively dispense soil from second conveyor. In one embodiment, the actuator is operatively connected to both the first conveyor and the second conveyor. In such embodiments, the actuator can be used to cease and commence movement of both the first and second conveyors. In some embodiments, the actuator may be operably connected to a programmable control panel, which in turn, is operatively connected to the drive system responsible for movement of the first conveyor and one or more motors responsible for driving movement of the second conveyor. In one embodiment, the actuator may be a foot-operated pedal. Other embodiments of the present disclosure relate to a method of potting plant life by selectively engaging the actuator.

Further embodiments and features, as well as the structure and operation of various embodiments are described in detail below with reference to the accompanying drawings. It should be understood that the summary above is provided to introduce, in simplified form, a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

Embodiments will now be described, by way of example only, with reference to the accompanying drawings in which corresponding reference symbols indicate corresponding parts. Further, the accompanying drawings, which are incorporated herein and form part of the specification, illustrate embodiments of the present invention and, together with the description, further serve to explain the principles of the invention and to enable a person skilled in the relevant art(s) to make and use the invention.

DETAILED DESCRIPTION

In the Summary above and in this Detailed Description, and the claims below, and in the accompanying drawings, reference is made to particular features, including method steps, of the invention. It is to be understood that the disclosure of the invention in this specification includes all possible combinations of such particular features. References to "one embodiment", "an embodiment", "some embodiments", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "comprises" and "includes", and grammatical equivalents thereof are open-ended and are used herein to mean that other components, steps, etc. are optionally present. For example, a system "comprising" components A, B, and C can contain only components A, B, and C, or can contain not only components A, B, and C, but also one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

Figure 1:
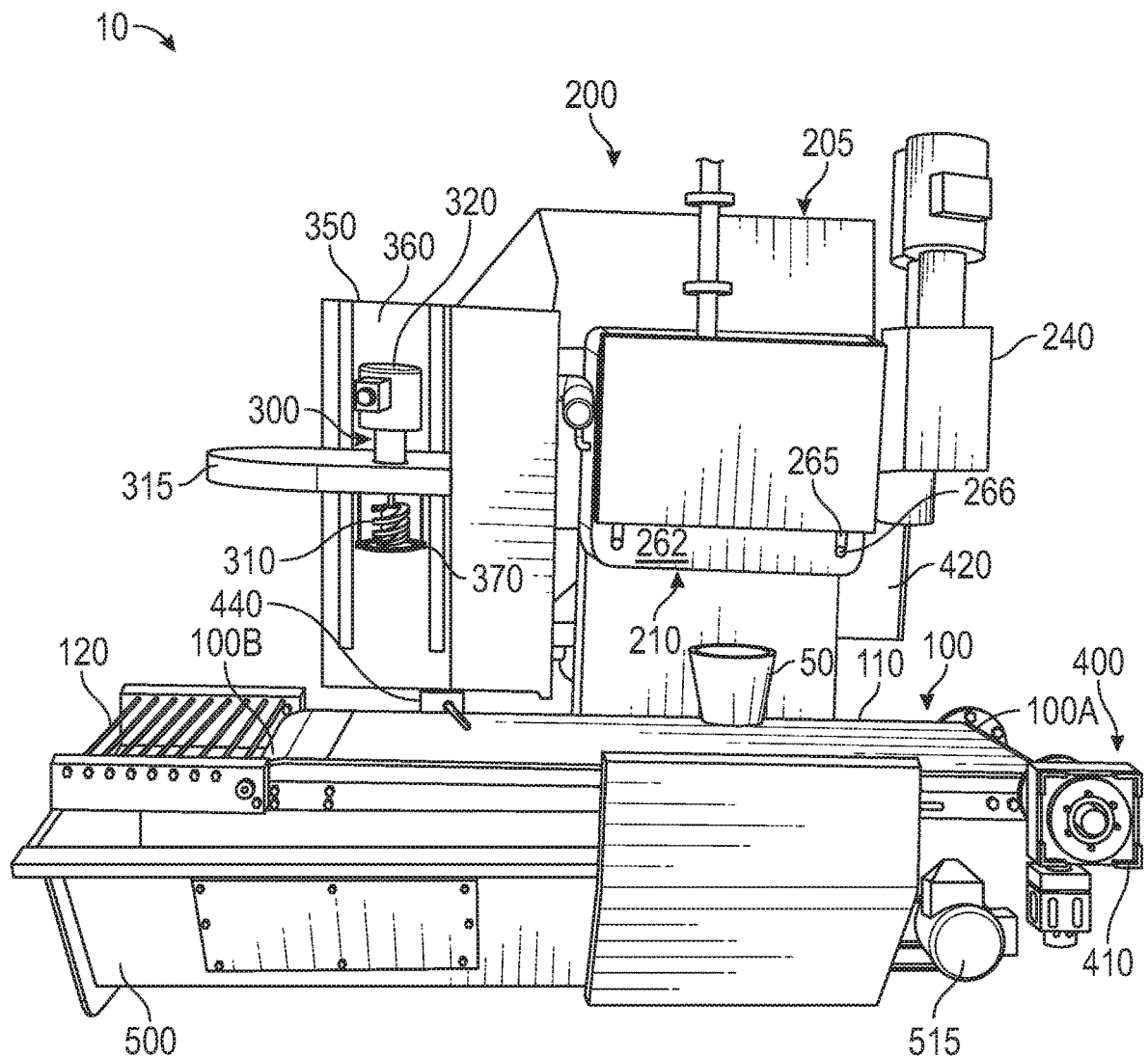
FIG. 1 is a front view of an embodiment of a potting apparatus having features consistent with the principles of the present disclosure.

Turning to the drawings, FIGS. 1-11 show various embodiments of a potting apparatus 10, or components thereof, which may be utilized during the potting of plants of variable height. FIG. 1 provides a front view of a potting apparatus 10 according to one embodiment of the present disclosure. As shown in FIG. 1, the potting apparatus 10 includes a first conveyor, a soil delivery system 200 adapted to receive and dispense soil, a drill 300 movably positioned relative to the first conveyor 100, and a drive system 400 operatively connected to, and adapted to drive, the first conveyor 100.

The first conveyor 100 may be a belt conveyor suitable for receiving one or more pots 50 thereon. As shown in FIG. 1, the first conveyor 100 may be a linear belt conveyor having a generally flat belt surface 110 devoid of any pot-receiving structures, though, in alternative embodiments, the first conveyor 100 may ultimately define a non-linear path and/or include one or more structures adapted to receive a pot 50. The soil delivery system 200 includes a loading area 205 for receiving soil and a discharge area 210 from which soil within the soil delivery system 200 may be dispensed. The discharge area 210 of the soil delivery system 200 is positioned above and relative to the first conveyor 100 so that potting soil dispensed form the soil delivery system 200 is directed onto the first conveyor 100 or to a pot 50 disposed thereon during operation of the potting apparatus 10. As further shown in FIG. 1, the first conveyor 100 may have a first end 100A located upstream of the soil discharge area 210 of the soil delivery system 200 for loading pots 50 and a second, opposite end 100B located downstream of the discharge area 210.

The drill 300 is located downstream of the discharge area 210 and is movable about a horizontal plane extending above the first conveyor 100. As shown in FIG. 1, the drill 300 includes a drill bit 310 and a motor 320, where the motor 320 is operatively connected to and configured to drive rotation of the drill bit 310. The drill 300 is movable upwardly and downwardly relative to the first conveyor 100 such that the drill 300 may form a hole within the soil of a soil-filled pot 50 disposed on the first conveyor 100 when the drill 300 is placed in a first position disposed over the first conveyor 100. In some embodiments, the drill 300 may be a component of a larger drill apparatus 350, which includes a drill housing 360 that houses various components of the drill apparatus 350 disclosed herein. In some embodiments, the drill apparatus 350 may include a support arm 315, which extends outwardly from the drill housing 360 and supports the drill 300. As shown in FIG. 1, in some embodiments, the support arm 315 may carry the drill 300 such that the drill's 300 motor 320 is disposed above a top surface of the support arm 315 and the drill's 300 drill bit 310 is disposed beneath a bottom surface of the support arm 315. In some embodiments, the drill apparatus 350 may further include a packing plate 370 resiliently mounted relative to the drill 300. To hold the packing plate 370 in a fixed position, the packing plate 370 may be secured to the support arm 315. The packing plate 370 may, in some embodiments, be sized to have a diameter equal to or greater than the diameter of a pot 50 disposed on the first conveyor 100. The packing plate 370 has an aperture formed therein and the drill 300 is positioned as to be extendable through the aperture of the packing plate 370 when the when the drill 300 is moved downwardly towards the first conveyor 100 to form a hole in the soil of a soil-filled pot disposed on the first conveyor 100.

As further shown in FIG. 1, in some embodiments, the potting apparatus 10 may further include a plurality of shafts 120 arranged in spaced parallel relation disposed adjacent the second end 100B of the first conveyor 100. A plurality of roller members may be affixed in various locations along the plurality of shafts 120. The plurality of shafts 120 may, in some embodiments, be driven by a motor dedicated to driving rotation of the plurality of shafts 120 or may be slave driven by one or more other components of the potting apparatus 10, e.g., by an axle associated with the first conveyor 100. In other embodiments, the plurality of shafts 120 may be non-motorized. Upon reaching the second end 100B of the first conveyor 100, a pot 50 may be transferred to the plurality of shafts 120. The soil delivery system 200 may further include a bin 500 disposed beneath the first conveyor 100 to collect excess or misdelivered soil. Upon reaching the second end 110B of the first conveyor 100, residual soil residing on top of the first conveyor 100 is deposited into the bin 500 positioned therebelow. In some embodiments, the bin 500 may extend the length of both the first conveyor 100 and the plurality of shafts 120, as shown in FIG. 1. Alternatively, the bin 500 may only extend the length of the first conveyor 100.

Figure 2:
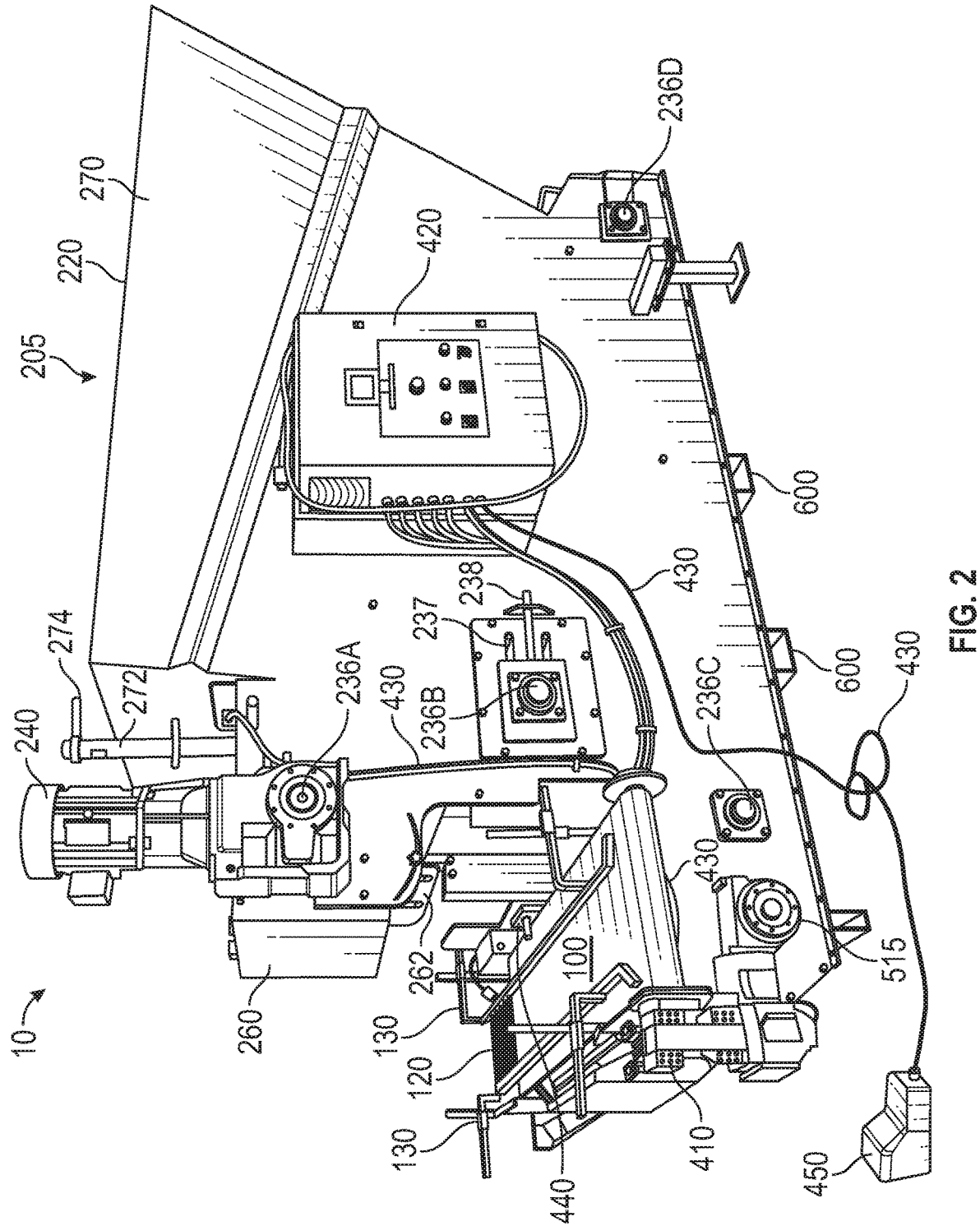
FIG. 2 is a perspective view of an embodiment of a potting apparatus having features consistent with the principles of the present disclosure.
Figure 3:
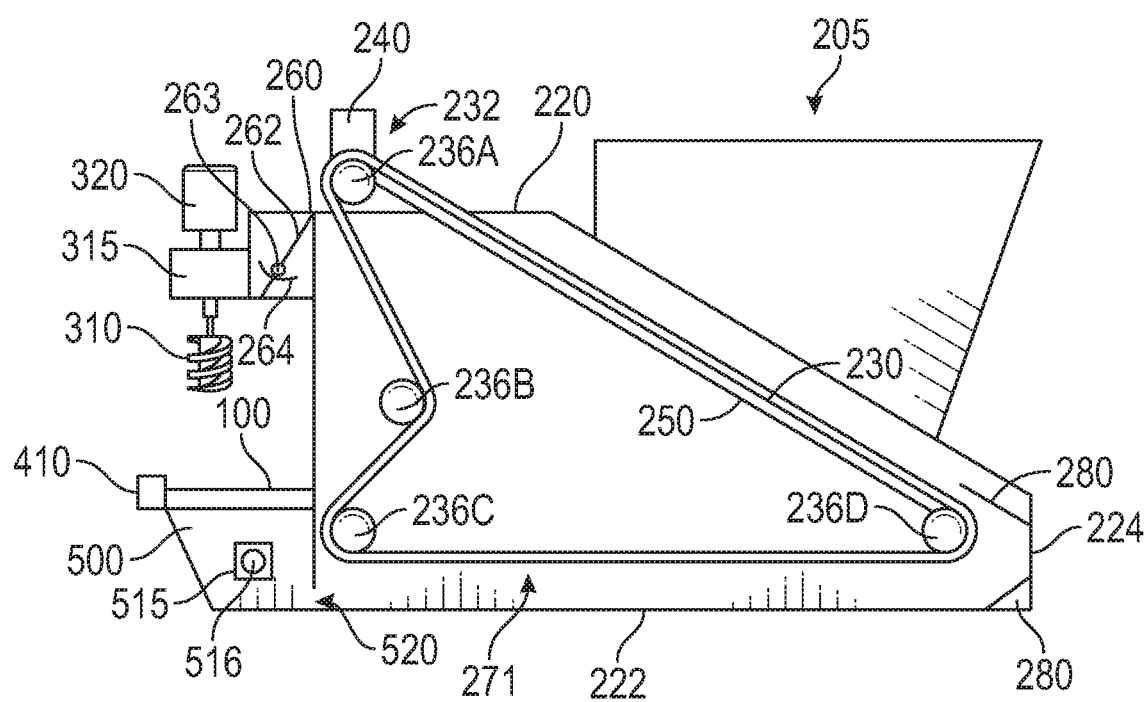
FIG. 3 is a right side, partially transparent schematic view of an embodiment of a potting apparatus having features consistent with the principles of the present disclosure.

FIG. 2 shows a right side perspective view of an embodiment of a potting apparatus 10 having features consistent with the principles of the present disclosure. FIG. 3 shows a right side, partially transparent schematic view of an embodiment of a potting apparatus having features consistent with the principles of the present disclosure to better show certain features of the soil delivery system 200. The drive system 400 includes a motor 410 operatively connected to the first conveyor 100 for driving rotation of the first conveyor 100 and moving pots 50 disposed thereon towards the first conveyor's 100 second end 100B. In an embodiment, the motor 410 of the drive system 400 may be a servomotor. In some embodiments, the drive system 400 may further include a programmable controller 420 that is operatively connected to, and controls action of, the motor 410 responsible for driving the first conveyor 100. As shown best in FIG. 2, the motor 410 associated with the first conveyor 100 may be operatively connected to the controller 420 by electrical wiring 430. As will be described in greater detail below, the controller 420 may be programmed to move the first conveyor 100 in an indexing manner such that the first conveyor 100 temporarily stops before recommencing movement to provide more efficient filling and/or drilling functionality during operation of the potting apparatus 10. As further shown in FIG. 2, the first conveyor 100 may optionally have a pot-adjustment mechanism 130 associated therewith for positioning pots 50 on the first conveyor 100 as they are driven from one end of the first conveyor 100 to the other. In some embodiments, the pot-adjusting mechanism 130 may be secured to a frame of the first conveyor 100 or to a portion of the soil delivery system 200, such as the bin 500. The pot-adjusting mechanism 130 may include one or more adjustable guide rails disposed on both sides of the first conveyor's 100 belt surface 110 and extending inwardly, as further shown in FIG. 2. The guide rails may be selectively adjusted to establish a pathway of a corresponding to the diameter of a pot 50 disposed on the on the first conveyor. The guide rails defining the pot-adjusting mechanism 130 may also be selectively adjusted in a manner such that the pathway formed thereby directs pots 50 located on the first conveyor 100 under the drill 300 when the potting apparatus 10 is placed in a drilling configuration.

As shown in FIGS. 2-3, the soil delivery system 200 includes a housing 220, a second conveyor 230 within the housing 220, and at least one motor 240 operatively connected to the second conveyor 230 for driving rotation of the second conveyor 230. A channel 250 formed within the housing 220 defines an upwardly extending path along which the second conveyor 230 may move soil from the interior of the soil delivery system 200 to the discharge area 210 for delivery onto the first conveyor 100. As further shown in FIG. 2, in some embodiments, the housing 220 may include one or more hollow feet members 600 for receiving the forks of forklifts or pallet jacks to enable simple relocation of the potting apparatus 10.

In some embodiments, the discharge area 210 of the soil delivery system 200 may be defined, at least in part, by a discharge chute 260 positioned adjacent to the uppermost end 232 of the second conveyor 230, as shown best in FIG. 3. In such embodiments, the discharge chute 260 has an opening extending from its top end to its bottom end to permit the passage of soil therethrough. The discharge chute 260 is positioned relative to the first conveyor 100 so that soil exiting the discharge chute 260 is directed onto the first conveyor 100. As such, the discharge chute 260 may extend over a portion of the first conveyor 100. To not obstruct the totality of air space above the first conveyor 100, the soil delivery system 200 of the present disclosure may, in some embodiments, be designed and oriented relative to the first conveyor 100 such that neither the second conveyor 230 nor the discharge chute 260 transversely extend across the entirety of the first conveyor 100, unlike potting apparatuses currently known in the art.

The discharge chute 260 may be formed by the housing 220 or may be a separate structure secured to the housing 220. As further shown in FIG. 3, the discharge chute 260 may, in some embodiments, include a panel 262 movably secured within its interior that may be adjusted to regulate the flow rate of soil exiting the discharge chute 260. For instance, the panel 262 may be moved in a first direction to provide a larger pathway from the top end of the discharge cute 260 to the bottom of the discharge chute 260, thereby increasing the flow rate, or may be moved in a second direction to provide a narrower pathway, thereby decreasing the flow rate. In this way, users can tailor the outflow of soil from the soil delivery system 200 to the volumetric capacity of specific pots 50. In some embodiments, one end of the panel 262 may be secured by a hinged connection to permit the panel 262 to assume different positions within the interior of the discharge chute 260.

To permit adjustment of the panel 262 from the exterior of the discharge chute 260, the panel 262 may have a handle 263 secured thereto that extends from the interior of the discharge chute 260, through a slit 264, and into the external environment. The handle 263 may be moved along the slit 264 to adjust the positioning of the panel 262. To further direct the flow of soil towards the interior volume of pots 50 disposed on the first conveyor 100, the length of the panel 262 may be adjustable in some embodiments. In one such embodiment, the panel 262 may include a first panel member and a second panel member that is slidably secured to the first panel member. The first panel member and second panel member may be fastened together using one or more suitable fasteners 266. In one embodiment, each fastener 266 is defined by a nut and bolt. To enable slidable adjustment of the second panel member, the second panel member may have one or more elongated channels 265 through which the one or more fasteners 266 may pass, as shown best in FIG. 1. In such embodiments, the overall length of the panel 262 may be adjusted by adjusting the location at which the one or more fasteners 266 are located along the length of the one or more channels 265. For instance, to extend the length of the panel 262, and thus the discharge chute 260 as a whole, the second panel member may be slidably adjusted so that the one or more fasteners 266 are located closer to the top of the one or more channels 265. Conversely, the length of the panel 262 may shortened by adjusting the second panel member so that the one or more fasteners 266 are located closer to the bottom end of the one or more channels 265. In some embodiments, the housing 220 may include a vertically adjustable gate 272 which may be raised or lowered by rotation of a handle 274 to regulate the volume of soil entering the discharge chute at a given time, as best shown in FIG. 2.

Figure 4A:
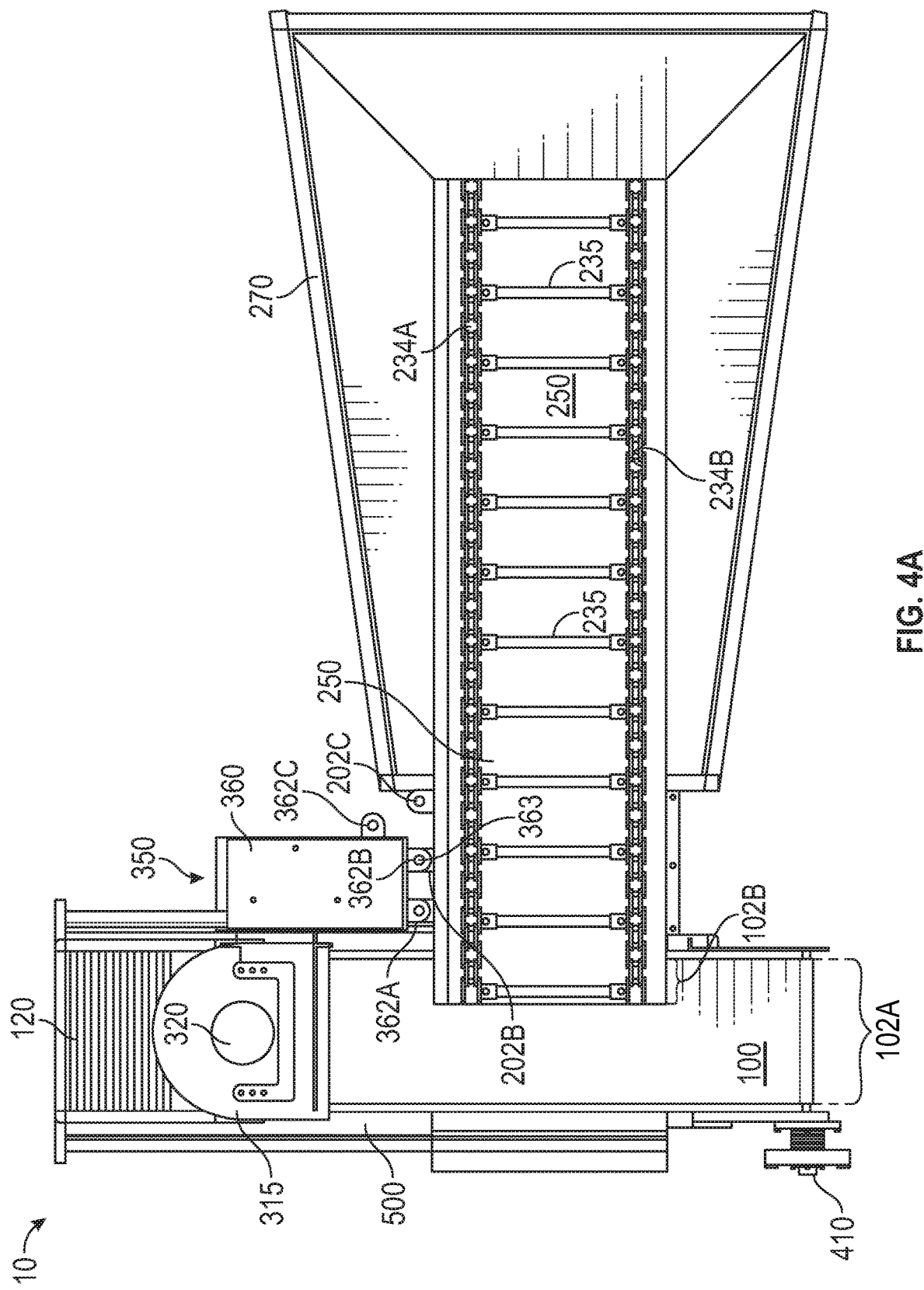
FIG. 4A is a top plan view of an embodiment of a potting apparatus having features consistent with the principles of the present disclosure, wherein the potting apparatus's drill is in a first position relative to the potting apparatus's first conveyor.
Figure 4B:
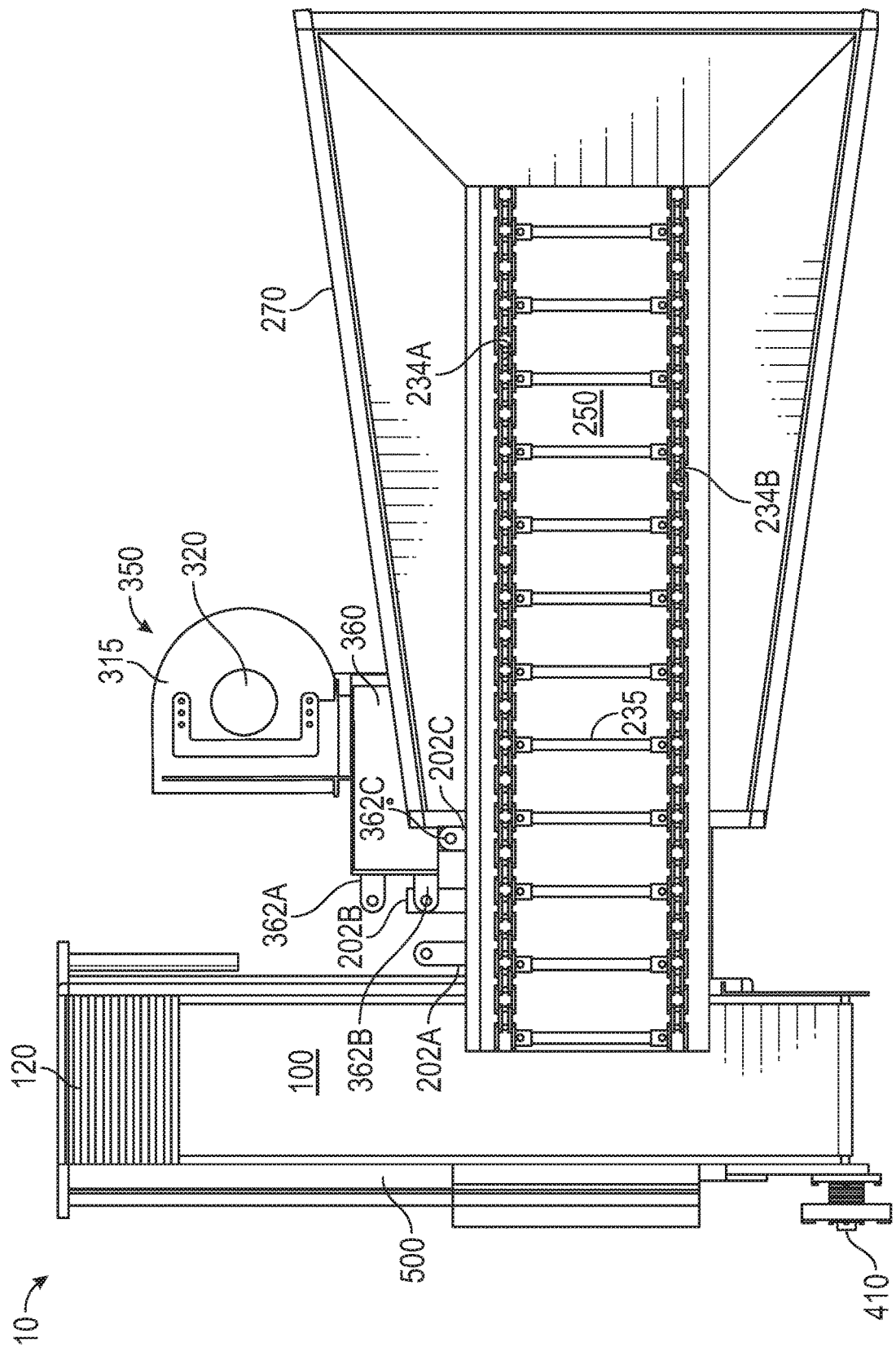
FIG. 4B is a top plan view of the potting apparatus of FIG. 4A, wherein the potting apparatus's drill is in a second position relative to the apparatus's first conveyor.
Figure 5:
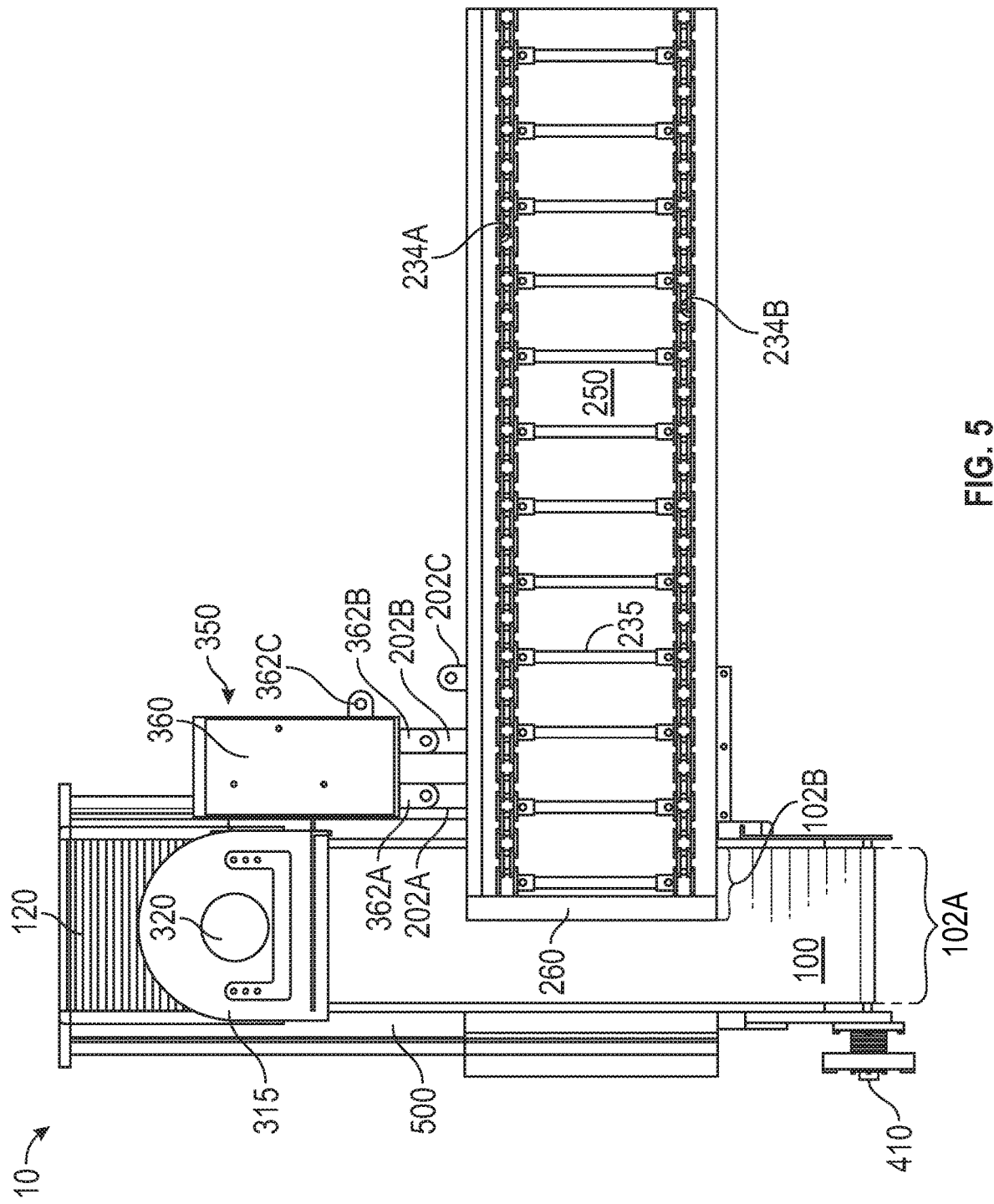
FIG. 5 is a top plan view of an embodiment of a potting apparatus having features consistent with the principles of the present disclosure, wherein the potting apparatus's drill is in a first position relative to the apparatus's first conveyor.

FIGS. 4A-4B show a top plan view of the potting apparatus 10 according to one embodiment of the present disclosure in two different potting configurations. FIG. 5 shows a top plan view of a potting apparatus 10 according to another embodiment of the present disclosure. As shown in FIGS. 4A-4B, the soil delivery system 200 may, in some embodiments, be devoid of a discharge chute 260. Rather, in such embodiments, the discharge area 210 of the soil delivery system 200 is defined by the uppermost end 232 of the second conveyor 230. In such embodiments, the uppermost end 232 of the second conveyor 230 is positioned relative to the first conveyor 100 so that soil leaving the uppermost end 232 of the second conveyor 230 is directed onto the first conveyor 100. As such, the uppermost end 232 may, in some embodiments, transversely extend over a portion of the first conveyor 100.

As shown, e.g., in FIGS. 1-4B, the soil delivery system 200 may include a hopper 270 having an open top for receiving and directing soil to the second conveyor 230. The hopper 270 may be formed by the housing 220 or may be a separate structure secured to the housing 220. In some embodiments, such as that shown in FIG. 5, the soil delivery system 200 may be devoid of the above-described hopper 270. In such embodiments, the housing 220 may have an opening therein which exposes the second conveyor 230. As best shown in FIGS. 4A-5, the second conveyor 230 may be a chain conveyor defined by two opposing chains 234A, 234B and a plurality of bars 235 extending between the opposing chains 234A, 234B. One of skill in the art will appreciate, however, that other conveyors suitable for receiving and directing soil to the first conveyor 100 may be utilized without departing from the scope of the present disclosure. For instance, in an alternative embodiment, the second conveyor 230 may be a belt conveyor.

As best shown in FIGS. 2-3, in some embodiments, the second conveyor 230 is an endless conveyor that extends around a plurality of shafts 236A-236D. At least one shaft of the plurality of shafts 236A-236D is driven by a motor 240. In one embodiment, as shown best in FIGS. 2-3, the shaft 236A located at the uppermost end 232 of the second conveyor 230 is operatively connected to a motor 240 such that the motor 240 drives rotation of the shaft 236A, thereby driving movement of the second conveyor 230. In some embodiments the motor 240 may be operatively connected to, and controlled by, a programmable controller 420. In some embodiments, the motor 240 driving rotation of the second conveyor 230 may be a servomotor. As shown in FIG. 2 the motor 240 associated with the second conveyor 230 may be operatively connected to the programmable controller 420 via electrical wiring 430. In some embodiments, one or more shafts of the plurality of shafts 236A-236D may be movably secured such that the one or more shafts may be moved to affect the tension of the second conveyor 230. As further shown in FIG. 2 in one embodiment, shaft 236B may be slidably secured to the housing 220 such that shaft 236B may be slid in a first direction along an opening 237 within the housing 220 to increase the tension of the second conveyor 230 and may be slid in a second, opposite direction along the opening 237 to decrease the tension of the second conveyor 230. To facilitate repositioning of shaft 236B, one or more tensioning rods 238 may be disposed on the exterior of the housing 220. The one or more tensioning rods 238 may be associated with shaft 236B, such that the one or more tensioning rods 238 may be rotated in a first direction to push the shaft 236B in one direction and may be rotated in a second direction to pull the shaft 236B in another direction.

As shown best in FIG. 3, two or more shafts of the plurality of shafts 236A-236D may cause a portion of the second conveyor 230 to be driven generally parallel to the bottom 222 of the housing 220. The space existing between the portion of the second conveyor 230 extending between the two or more shafts 236C, 236D and the bottom 222 of the housing 220 defines a channel 271 along which soil collected within the bin 500 may travel to be redirected to the channel 250 and subsequently discharged onto the first conveyor 100. Movement of the soil within the channel 271 may be caused by movement of the portion of the second conveyor 230 extending in parallel with the bottom 222 of the housing 220 (portion of the second conveyor 230 extending between shafts 236C and 236D in FIG. 3). To redirect soil within the channel 271 back to upwardly extending channel 250 along which soil is moved to the discharge area 210, a lower sidewall 224 of the housing 220 disposed opposite the bin 500 may have a bracket 280 secured thereto with one or more arms defining a curved pathway leading to the upwardly extending channel 250. In some embodiments, lower sidewall 224 of the housing 224 may act as a door or hatch within the housing 220 that provides access to the interior of the housing 220. As such, the lower sidewall 224 portion may be hingedly attached to another portion of the housing 220 in some embodiments.

Figure 6:
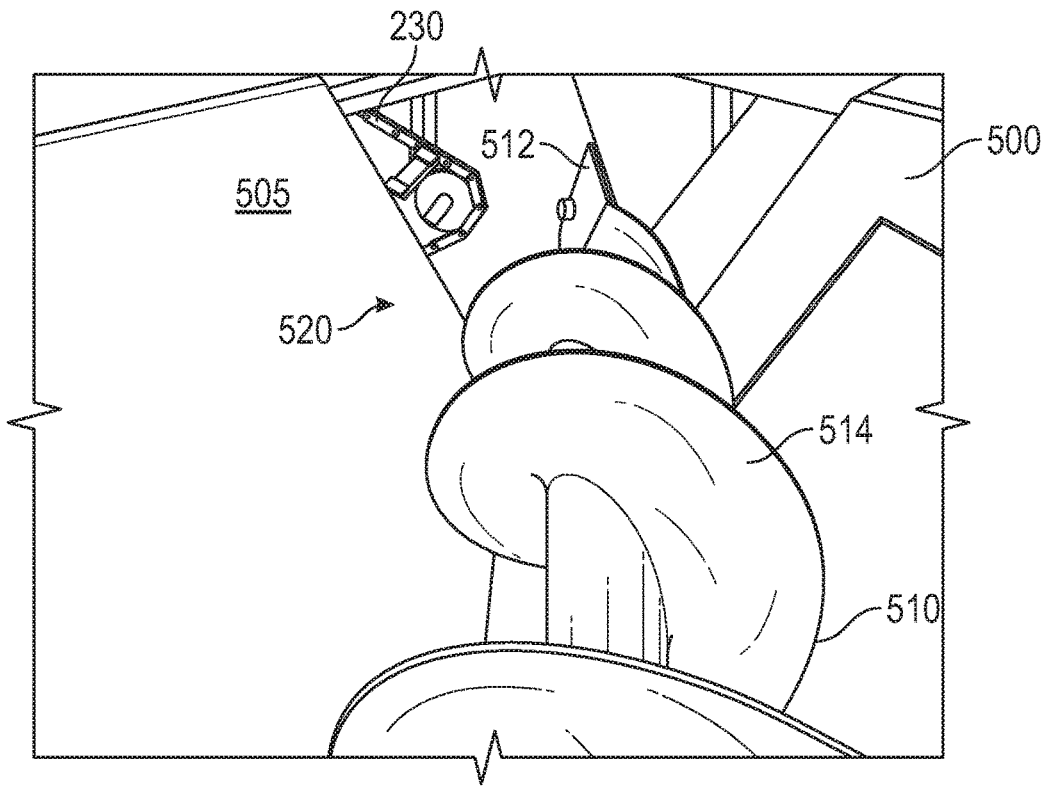
FIG. 6 is a partial isolated view of an embodiment of a bin, an auger, and a second conveyor having features consistent with the principles of the present disclosure.

FIG. 6 provides a partial isolated interior view of the bin 500 disposed beneath the potting apparatus's 10 first conveyor 100. As shown in FIG. 6, to permit passage of soil collected within the bin 500 to the channel 271 beneath the second conveyor 230, the sidewall 505 of the bin 500 positioned closest to the second conveyor 230 has an opening 520 therein. In some embodiments, a portion of the second conveyor 230 may extend through the opening 520 into to the bin's 500 interior. In other embodiments, the second conveyor 230 may be positioned adjacent to the opening 520 such that soil within the bin must pass through the opening 520 before reaching the second conveyor 230. To direct soil deposited within bin 500 towards the opening 520, an auger 510 is disposed within the interior and extends the length of the bin 500. As best shown in FIGS. 1-2, a motor 515 is operatively connected to the auger 510 to drive rotation of the auger 510. As shown in FIG. 2, the motor 515 associated with the auger 510 may be operatively connected to the programmable controller 420 via electrical wiring 430 such that rotation of the auger 510 may be controlled by the controller 420. In some embodiments, the motor 515 associated with the auger 510 may be a servomotor. Alternatively, the motor 515 may be isolated from the controller 420 and manually controlled or the auger 510 may be slave driven by another component of the potting apparatus 10.

Figure 7:
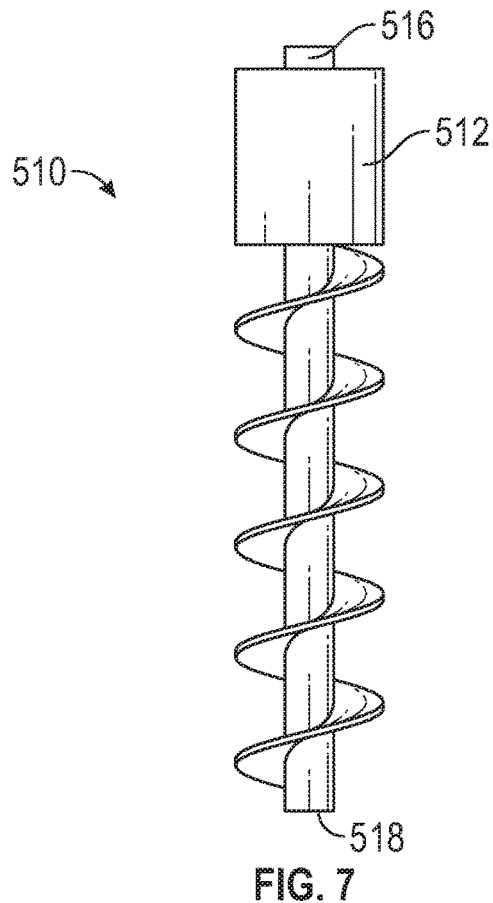
FIG. 7 is an isolated view of the auger shown in FIG. 6.

FIG. 7 provides an isolated view of the auger 510. As shown in FIG. 7, the auger 510 may include a flat or curved head 512 designed to push soil towards the opening 520 positioned adjacent to the opening 520 and a helical screw blade 514 extending downwardly from the head 512. To rotatably secure the auger 510 within the bin 500, a first end 516 of the auger 510 may extend through an opening within a first end of the bin 500 and a second end 518 of the auger may extend through an opening with a second end of the bin 500. The bin 500 may be defined by housing 220 or the bin 500 may be a separate structure secured to the housing 220. In some embodiments, the bin 500 may serve to, at least partially, support the first conveyor 100.

Figure 8A:
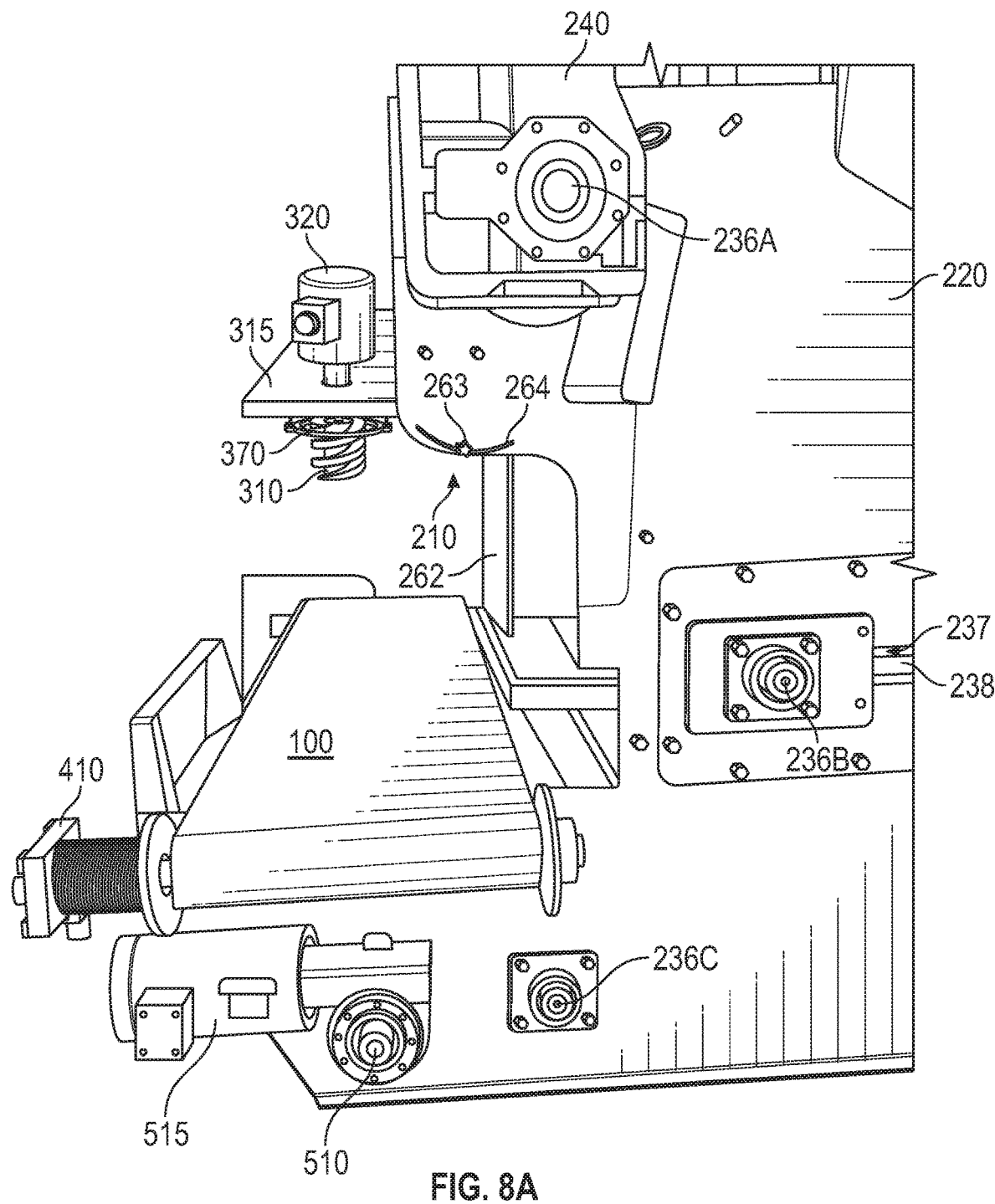
FIG. 8A is a partial right-side view of an embodiment of a potting apparatus having features consistent with the principles of the present disclosure, wherein the potting apparatus's drill is in a first position relative to the potting apparatus's first conveyor.
Figure 8B:
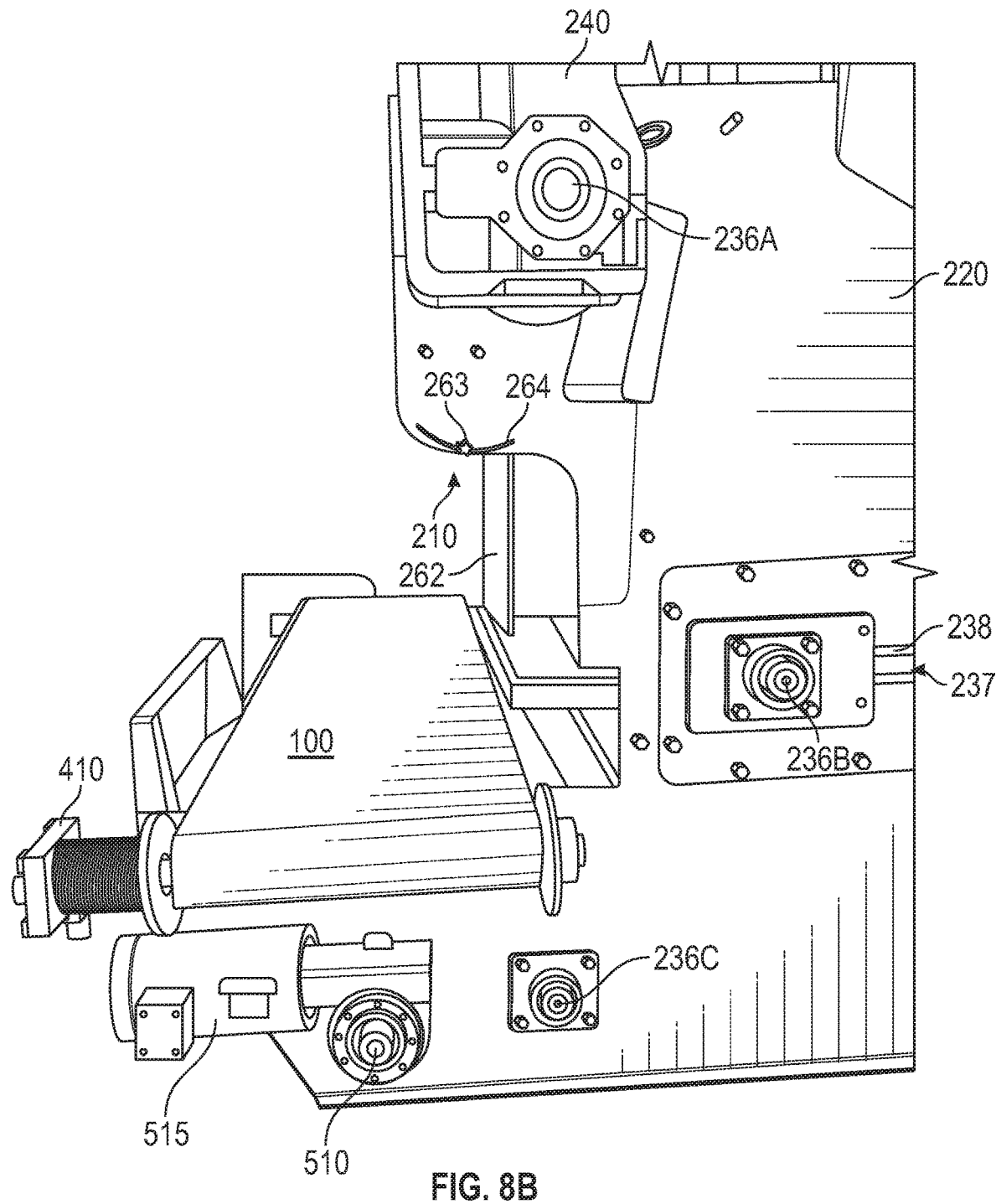
FIG. 8B is a partial right-side view of the potting apparatus of FIG. 8A, wherein the potting apparatus's drill is in a second position relative to the potting apparatus's pot conveyor.

FIGS. 8A-8B provide a partial side view of the potting apparatus 10 with its drill 300 placed in two different positions relative to the first conveyor 100. As shown in FIGS. 4A-5 and 8A-8B, the drill 300 of the potting apparatus 10 is movably positioned relative to the first conveyor 100 such that the drill is transitionable between a first position, as shown in FIGS. 4A, 5, and 8A, wherein the drill is disposed above the first conveyor 100 and a second position, as shown in FIGS. 4B and 8B, wherein the drill is not disposed above the first conveyor 100. In the first position the drill 300 is positioned relative to the first conveyor 300 such that the drill 300 obstructs the airspace above the first conveyor 100 and can be moved upwardly and downwardly in the manner disclosed herein to establish a hole within the soil of soil-filled pots disposed on the first conveyor 100, as best shown within FIGS. 4A, 5, and 8A. As such, when the drill 300 is in the first position, the potting apparatus 10 retains a first, "drilling mode" potting configuration designed to assist in the potting of plant life with smaller vertical profiles, such as small flowers requiring a designated hole for potting. Conversely, when the drill 300 is in the second position, the drill 300 is positioned relative to first conveyor 300 in a manner that does not obstruct the airspace above the first conveyor 300, as shown best in FIGS. 4B and 8B, the potting apparatus 10 retains a second, "bareroot mode" potting configuration that enables plant life with larger vertical profiles, such as trees extending several feet above its receiving pot 50 to travel to the second end 100B of the first conveyor 100 without being toppled by the drill 300. Accordingly, by transitioning the drill 300 between the first and second position, users can easily adapt the potting apparatus 10 to accommodate the potting needs of plant life with both small and large vertical profiles.

The drill 300 may be movably positioned relative to the first conveyor 100 by virtue of the drill 300 being rotatably secured to the first conveyor 100, such as to a frame of the first conveyor (not shown), or to the soil delivery system 200, as shown in FIGS. 4A-5. In some embodiments, the drill 300 may be a component of a larger drill apparatus 350 that is rotatably secured to the first conveyor 100 or to the soil delivery system 200, as shown in FIGS. 4A-5. Alternatively, the drill 300 or a support arm 315 carrying the drill 300 may be directly rotatably secured to the first conveyor 100 or soil delivery system 200.

As shown best in FIGS. 4A-5, in some embodiments, the drill apparatus 350 may be rotatably secured to the soil delivery system 200 by virtue of the drill apparatus 350 housing 360 described herein being hingedly secured to an exterior surface of the soil delivery system 200, such as to an exterior surface of the hopper 270 and/or housing 220. In one embodiment, the hinged connection between the drill apparatus's 350 housing 360 and the soil delivery system 200 may be defined by a knuckle 362B extending outwardly from the housing 360, a knuckle 202B extending outwardly from an exterior surface of the soil delivery system 200, and a pin 363 passing through the knuckle 362B of the housing 360 and the knuckle 202B of the soil delivery system 200. As evidenced by comparing FIGS. 4A and 4B, the pivot point defined by knuckles 362B, 202B, and pin 363 permits the drill 300 to rotate about a horizontal plane located above the first conveyor 100, thereby enabling the drill 300 to transition between the first position and second position. As further shown by comparing FIGS. 4A and 4B, in some embodiments, the drill apparatus 350 may be rotatably secured to the soil delivery system 200 as to permit the drill 300 to rotate approximately 90 degrees. In some embodiments, the housing 360 of the drill apparatus 350 and soil delivery system 200 may include additional knuckles 362A, 362B, 202A, 202C, which assist to secure the drill 300 in either the first or second position relative to the first conveyor 100. As shown best in FIGS. 4A and 5, in some embodiments, the drill 300 may be secured in the first position by rotating the drill apparatus 350 about the pivot point defined by knuckles 362B, 202B and pin 363, until a knuckle 362A disposed on a first side of drill housing 360 knuckle 362B is aligned with a knuckle 202A disposed on a first side of soil delivery system 200 knuckle 202B and inserting a pin or other fastener through the two to hold the drill 300 in position over the first conveyor 100. The drill 300 may be moved from the first position to the second position by removing the pin or other fastener from knuckles 362A and 202A, rotating the drill 300 and/or drill apparatus 350 about the pivot point defined by knuckles 362B, 202B and pin 363 until a knuckle 362C disposed on a second side of drill apparatus 350 housing 360 knuckle 362B is aligned with a knuckle 202C disposed on a second side of soil delivery system 200 knuckle 202B, and inserting the pin or other fastener through knuckles 362C and 202C to hold the drill 300 adjacent to the airspace over the first conveyor 100, as shown best in FIG. 4B. In this way, the potting apparatus 10 may be easily transitioned between a "drilling mode" potting configuration designed to assist in the potting of plant life with smaller vertical profiles and a "bareroot mode" potting configuration designed to assist in the potting of plant life with larger vertical profiles.

To provide sufficient airspace above the first conveyor 100 to permit pots 50 loaded with plant life having a larger vertical profile, such as trees extending several feet above their receiving pot 50, to travel past the discharge area 210 of the soil delivery system 200 without being toppled, the soil delivery system 200 preferably does not extend across the entirety of the first conveyor 100. In some embodiments, the first conveyor 100 may be of a first width 102A and the portion of the soil delivery system 200 extending over the first conveyor 100 may define a second width 102B smaller than the width 102A of the first conveyor 100. As further shown in FIG. 4A, in one embodiment, the portion of the soil delivery system 200 extending over the first conveyor 100 may define a width 102B that is less than half the width 102A of the first conveyor 100. As shown in FIG. 5, in another embodiment, the portion of the soil delivery system 200 extending over the first conveyor 100 may define a width 102B equal to approximately half the width 102A of the first conveyor 100.

Figure 9A:
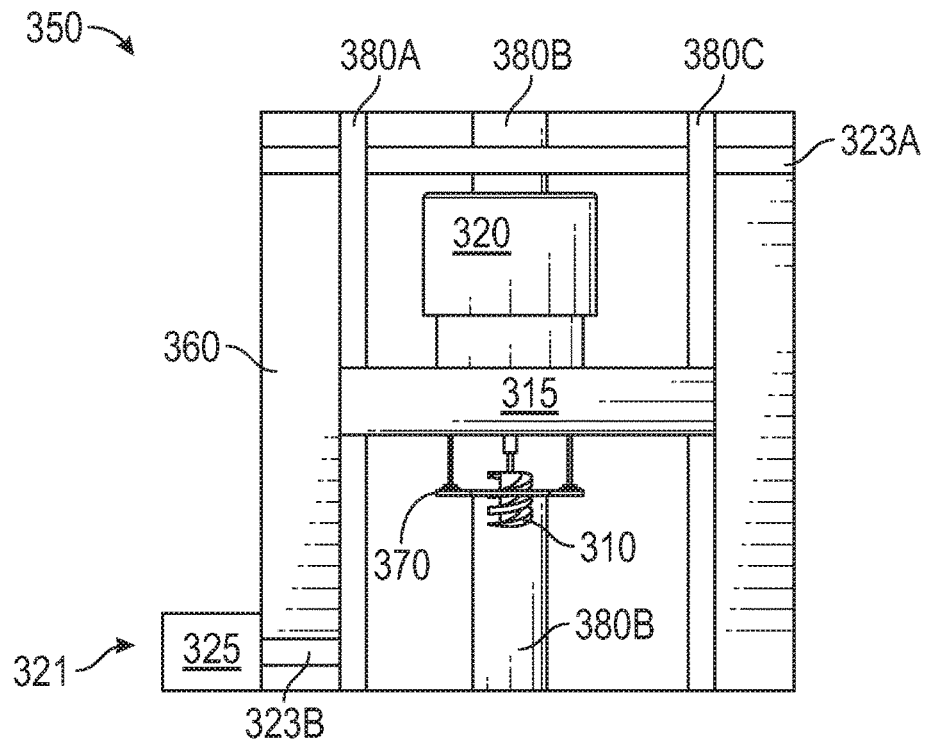
FIG. 9A is an partially transparent front view of an embodiment of a drill apparatus having features consistent with the principles of the present disclosure.
Figure 9B:
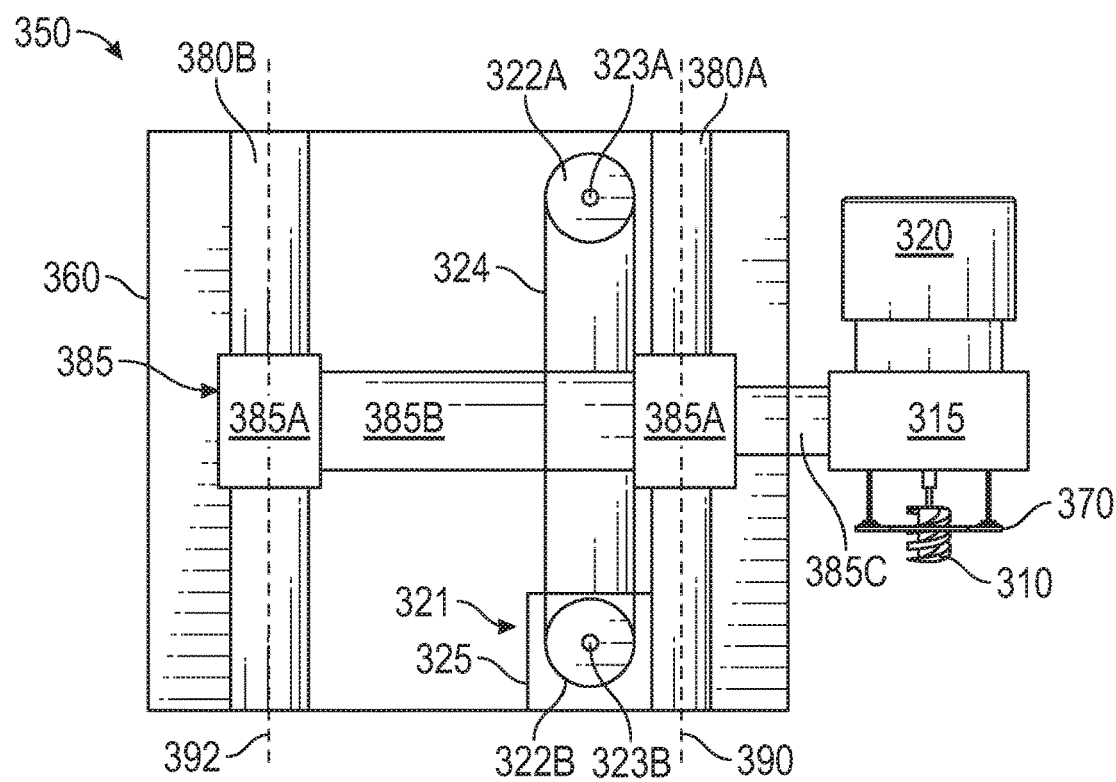
FIG. 9B is a partially transparent left side view of the drill apparatus of FIG. 9A.
Figure 9C:
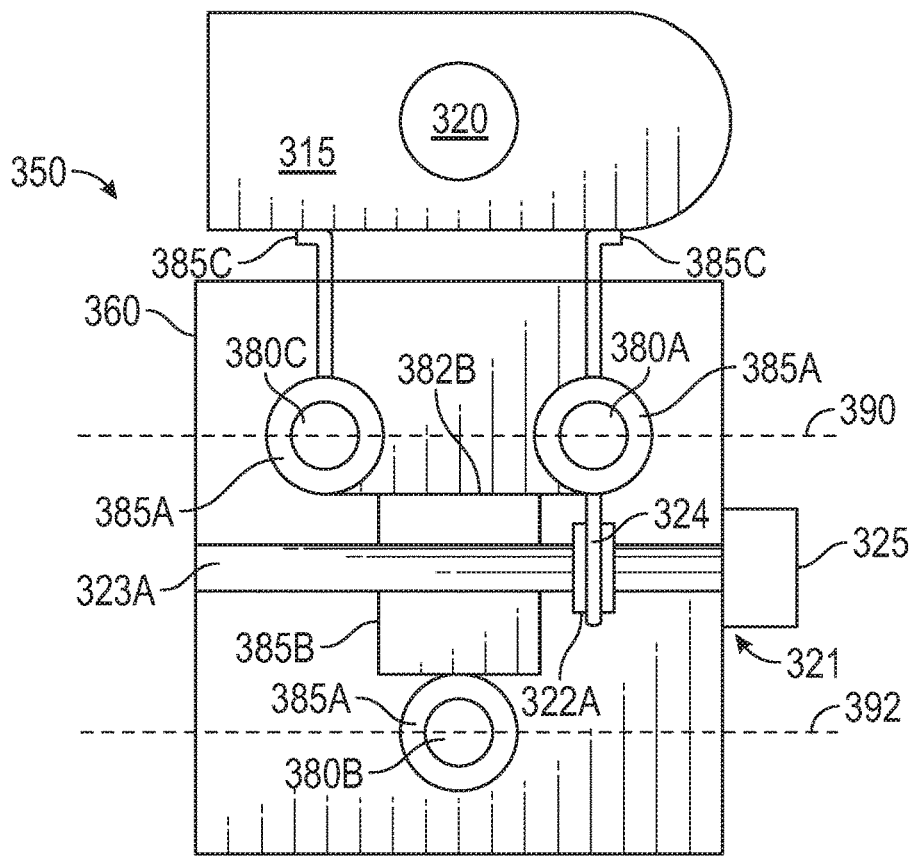
FIG. 9C is a partially transparent top plan view of the drill apparatus of FIG. 9A.
Figure 10:
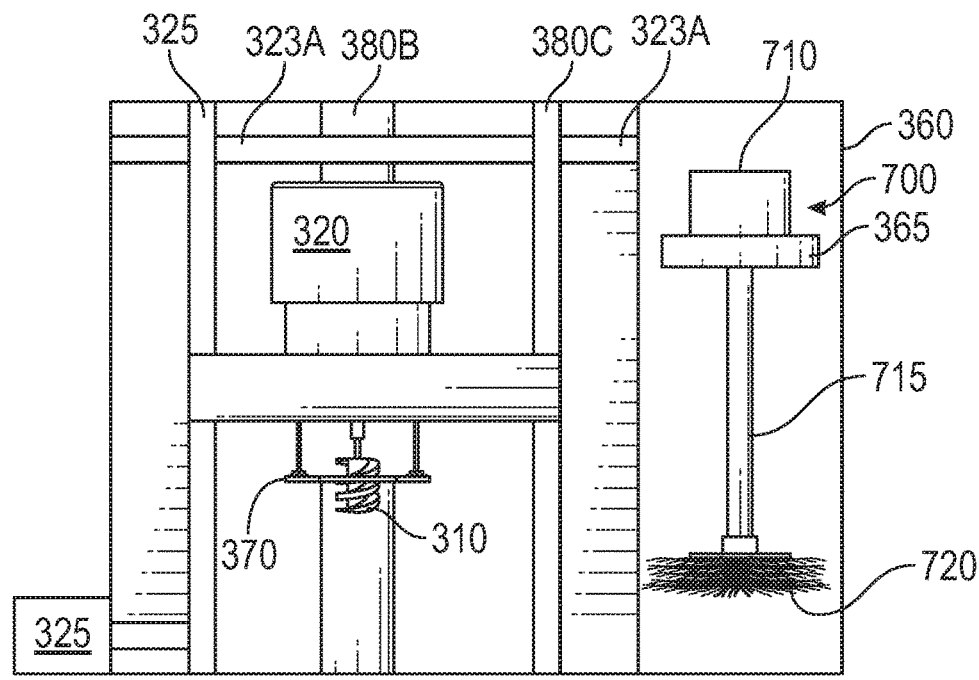
FIG. 10 is a partially transparent front view of an embodiment of a drill apparatus having features consistent with the principles of the present disclosure.

FIGS. 9A-10 show various embodiments of a drill apparatus 350 that may be utilized in some embodiments of the potting apparatus 10 of the present disclosure. To better illustrate certain components which may be disposed within an interior compartment of the drill apparatus 350 and normally obstructed from view, certain portions of the drill apparatus's 350 housing 360 have been removed in FIGS. 9A-10. As shown in FIGS. 9A-10, the drill apparatus 350 may include a drill housing 360, one or more drill support shafts 380A-380C longitudinally disposed within the housing 360, a support arm 315 slidably secured to one or more of the one or more drill support shafts 380A-380C, the drill 300 secured to the support arm 315, and a drill drive system 321 configured to move the drill 300 upwardly and downwardly.

FIGS. 9A-9C show a front elevational partially transparent view, a left side elevational partially transparent view, and a top plan partially transparent view, respectively, of a drill apparatus 350 according to one embodiment of the present disclosure. The drill apparatus 350 may, in some embodiments, include a plurality of support shafts 380A-380C to which the support arm 315 carrying drill 300 may be directly or indirectly slidably secured. Although the use of multiple longitudinal support shafts to guide vertical movement of a drill is known within the art, embodiments of the present disclosure improve upon the prior art by orienting a plurality of support shafts in a novel manner. Generally, in prior art potting apparatuses, each support shaft responsible for guiding the vertical movement of the apparatus's drill is arranged adjacent to at least one other support shaft such that all of the support shafts are located along the same vertical plane, like that of support shafts 380A and 380C shown in FIG. 9C. As such, within the prior art, no support shaft is more forwardly or rearwardly positioned relative to the apparatus's drill than the other support shafts used. It has been found that such support shaft arrangement permits undesired lateral movement of the drill and/or support structure carrying the drill, which reduces the apparatus's overall drill rate—i.e., the number of times the drill can be lowered and raised during a one-minute time period. The inventor of the present disclosure has, however, found that undesired lateral movement of the drill and/or support structure carrying the drill can be significantly reduced, thereby increasing the apparatus's overall drill rate, by offsetting the support shafts across a plurality of vertical planes. Accordingly, the drill apparatus 350 preferably includes at least two support shafts 380A-380C distributed across a plurality of vertical planes relative to the potting apparatus's 10 drill 300.

In FIGS. 9B and 9C, dashed line 390 represents a first vertical plane and dashed line 392 represents a second vertical plane positioned rearward of the first vertical plane 390. As shown in FIGS. 9B-9C, in one embodiment, the drill apparatus 350 includes a plurality of support shafts 380A-380C, where the plurality of support shafts includes at least one support shaft 380A, 380C located along a first vertical plane 390 and at least one support shaft 380B located along a second vertical plane 392 positioned rearward of the first vertical plane 390. As shown by the exemplary embodiments illustrated in FIGS. 9A-10, the drill apparatus 350 may, in some embodiments, include two support shafts 380A, 380C located along a first vertical plane 390 and a single support shaft 380B located along a second vertical plane 392 positioned rearward of the first vertical plane 390. Alternatively, the drill apparatus 350 may include two support shafts located along the second vertical plane 392 and a single support shaft located along the first vertical plane 390. As shown best in FIG. 9C, in some embodiments, the plurality of support shafts 380A-380C may be arranged in a triangular formation. Although not shown in the drawings, it is understood that drill apparatus 350 may include less than three support shafts for guiding vertical movement of the drill 300. For instance, in an alternative embodiment, support 380C may be removed such that the drill apparatus 350 includes only two support shafts, where one support shaft is located along a first vertical plane 390 and the other support shaft is located along second vertical plane 392 positioned rearward of the first vertical plane 390.

As shown best in FIGS. 9B-9C, the drill 300 or support arm 315 carrying the drill 300 may be indirectly slidably secured to the one or more support shafts 380A-380C by way of a bracket 385. The bracket 385 may include a slide member 385A for each support shaft of the one or more support shafts 380A-380C, one or more plates 385B interconnecting the slide members 385A, and one or more arms 385C for supporting the drill 300 or support arm 315 carrying the drill 300. Each slide member 385A has a bore formed therein of sufficient diameter to permit a support shaft 380A-380C to extend therethrough. As shown best in FIG. 9C, in one embodiment, the number of arms 385C within the bracket 385 may correspond to the number of slide members 385A located along the forward most vertical plane 390 such that each slide member 385A located the forward most vertical plane 390 has an arm 385C extending outwardly therefrom. Alternatively, the bracket 385 may include only a single arm 385C to support the drill 300 or support arm 315 carrying the drill 300. As further shown in FIG. 9C, the one or more arms 385C may extend from an interior of the drill apparatus's 350 housing 360 to an exterior of such housing 360 by way of one or more longitudinal openings within the housing 360.

The drill drive system 321 responsible for vertical movement of the drill may include two pulleys 322A, 322B disposed opposite of each other and a belt 324 rotatably coupled to the two pulleys 322A, 322B, as shown best in FIGS. 9B-9C. Each pulley 322A, 322B may be coupled to a horizontally extending shaft 323A, 323B. At least one of the shafts 323A, 323B has a motor 325 operatively connected thereto to drive movement of belt 324. As shown best in FIG. 9A, in some embodiments, shaft 323B may be a drive shaft of motor 325. In FIG. 9B, motor 325 is presented as being partially transparent to better show pulley 322B and belt 324 coupled thereto. To move the drill 300 in response to action of motor 325, the belt 324 may be connected to bracket 385 such that the bracket 385 moves as the belt 324 moves. The drill 300 is directly or indirectly connected to the bracket 385 such that movement of the bracket 385 caused by movement of belt 324 results in movement of the drill 300. In some embodiments, the support arm 315 carrying the drill 300 may serve to indirectly connect the drill 300 to the bracket 385. In one embodiment, as best shown in FIG. 9C, the belt 324 is connected to one of the bracket's 385 slide members 385A. To facilitate movement of the drill 300 upwardly and downwardly relative to the first conveyor 100, when the potting apparatus 10 is in a "drilling mode" potting configuration. The belt 324 preferably extends in a direction generally perpendicular to the direction in which the first conveyor 100 extends. In some embodiments, the motor 325 may be operatively connected to, and controlled by, the programmable controller 420. To provided controlled movement of the belt 324 in multiple directions, the motor 325 driving vertical movement of the drill 300 is preferably a servo motor.

As shown in FIG. 10, in some embodiments, the drill apparatus 350 may further include a brush mechanism 700 carried by the drill apparatus's 350 housing 360. The brush mechanism 700 may serve to remove excess soil from soil-filled pots 50 when the potting apparatus 10 is placed in a first potting configuration adapted to assist in the potting of plant life with smaller vertical profiles. As the brush mechanism 700 is carried by the rotatable drill housing 360, the brush mechanism 700 is transitionable between a first and second position relative to the first conveyor 100. The brush mechanism 700 may include one or more brushes 720 operatively connected to a motor 710 configured to drive rotation of the one or more brushes 720. In some embodiments, the one or more brushes 720 may be connected to a motor 710 of the brush mechanism 700 via a shaft 715 rotatably coupled to the motor 710. To accommodate pots 50 of variable height, the shaft 715 may be adjustable in length. In one embodiment, the shaft 715 may be telescopic. In some embodiments, the housing 360 may include a brush support arm 365 adapted to hold the brush mechanism 700 in fixed relation to the drill apparatus's 350 housing 360. In some embodiments, the motor 710 of the brush mechanism 700 may be operatively connected to, and controlled by, the programmable controller 420. In an embodiment, the motor 710 of the brush mechanism 700 may be a servomotor.

As noted above, some or all of the motors within the potting apparatus 10 may be operatively connected to a programmable controller 420 such that action of those motors connected to the controller 420, and thus the action of the components of the potting apparatus 10 driven by such motors, is dictated, at least in part, by the controller 420. The controller 420 may include one or more processors and memory operatively coupled to the one or more processors. The memory is configured to store programming instructions which may be executed by the one or more processors to perform various operations such as engaging or disengaging the one or more of the motors operatively connected to the controller 420. In some embodiments, the motor 410 responsible for driving movement of the first conveyor 100 may be operatively connected to the controller 420 and the controller 420 may be programmed to control the braking pattern and movement of the of the first conveyor 100 by dictating action of the first conveyor's 100 motor 410. As such, in some embodiments, the controller 420 may programmed to adjust the braking pattern of the first conveyor 100 to accommodate variables including, but not limited to, pot 50 capacity, the rate at which soil is dispensed from the soil delivery system 200, and the rate at which soil-filled pots are drilled. In an embodiment, the controller 420 is programmed to drive movement of the first conveyor 100 in an indexing manner so that pots 50 disposed on the first conveyor 100 can be stopped at a location of particular operation, e.g., beneath the discharge area 210 of the soil delivery system 200 or beneath the drill bit 310 of the drill 300. In some embodiments, the motor 325 of the drill drive system 321 responsible for moving the drill 300 upwardly and downwardly may be operatively connected to the controller 420 and the controller may be programmed to control vertical movement of the drill 300 by dictating action of the drill drive system's 321 motor 325. Similarly, the motor 240 associated with the second conveyor 230 of the soil delivery system 200 may, in some embodiments, be operatively connected to the controller 420 and the controller 420 programmed to control movement of the second conveyor 230 by dictating action of the second conveyor's 230 motor 240.

Figure 11:
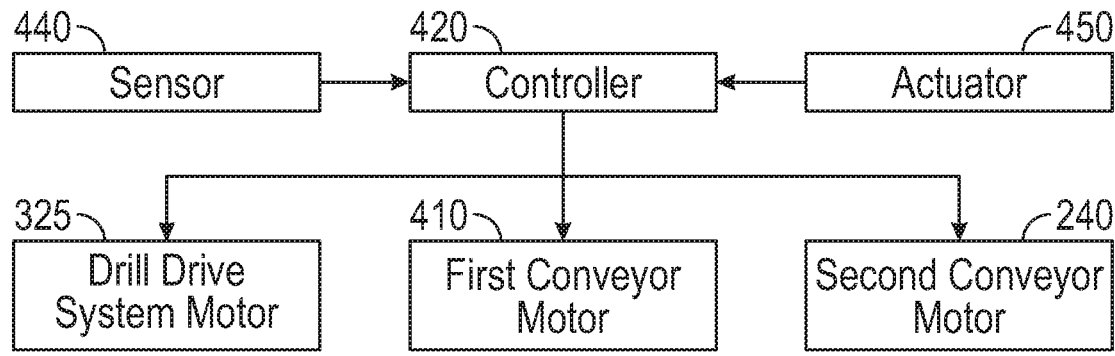
FIG. 11 is block diagram showing certain features of one embodiment of a potting apparatus having features consistent with the present disclosure.
Figure 12:
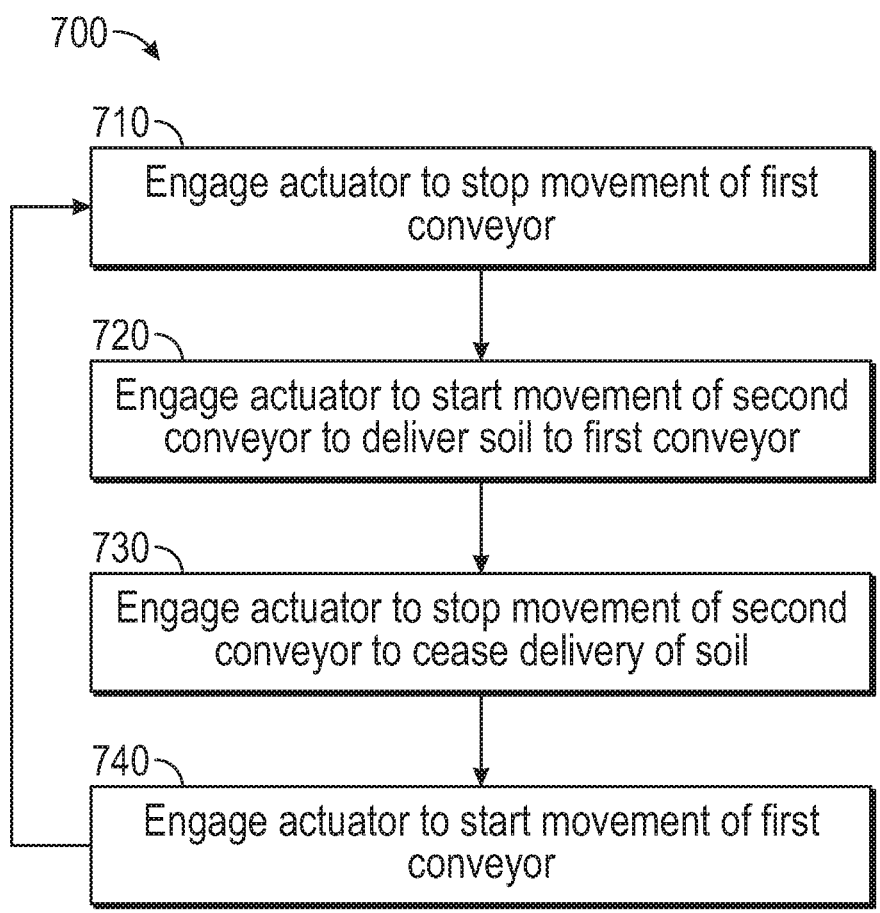
FIG. 12 is a flowchart depicting a method for delivering soil to a pot according to an embodiment of the present disclosure.

FIG. 11 shows a block diagram of certain components of the potting apparatus 10 according to one embodiment of the present disclosure and how such components may be associated with the programmable controller 420. As shown in FIGS. 1, 2, and 11, the potting apparatus 10 may further include a sensor 440 configured to detect when a pot 50 has reached a certain location on the first conveyor 100. As shown in FIG. 2, the sensor 440, in some embodiments, may be a mechanical limit switch which transmits an electrical signal when triggered. In other embodiments, the sensor 440 may be a photoelectric sensor adapted to transmit an electrical signal when triggered. As shown in FIG. 12, the sensor 440 is operatively connected to the controller 420 such that electrical signals generated as a result of the sensor 440 being triggered are directed to, and processed by, the controller 420. In some instances, the sensor 440 may be positioned along the first conveyor 100 as to detect when a pot 50 is in a position below the drill 300 and the controller 420 may be programmed such that when it receives a signal from the sensor 440, the controller 420 causes the first conveyor's motor 410 to move the first conveyor 100 in a manner that positions the pot 50 directly under the drill 300 and temporarily stops movement of the first conveyor 100 so that drilling of the pot can be completed. Accordingly, the drive system's 400 movement of the first conveyor 100 in an indexing manner may be based, at least in part, on the electrical signals transmitted from the sensor 440.

In an embodiment, the controller 420 may be programmed to ignore any signals transmitted by the sensor 440 when the potting apparatus 10 is in a "bareroot" mode potting configuration and the drill 300 is placed in the second position (not disposed over the first conveyor 100). When the pot 50 is positioned below the drill 300, the controller 420 may direct the motor 325 of the drill drive system 321 to lower the drill 300 downwardly into the soil of the pot 50 so as to complete the drilling operation to a desired depth. After the drilling operation is completed, the controller 420 may direct the motor 325 of the drill drive system 321 to move the drill 300 upwardly to a position above the pot 50 and may direct the first conveyor's motor 410 to recommence movement of the first conveyor 100 to further propel the pot 50 towards the first conveyor's 100 second end 100B.

The potting apparatus 10 may, in some embodiments, further include a user-controlled actuator 450 operatively connected to at least one of the first conveyor 100 and the soil delivery system 200. In some embodiments, the actuator 450 may be operatively connected to the first conveyor 100 such that the actuator 450 can be used to cease and recommence movement of the first conveyor 100. In some embodiments, the actuator 450 may be operatively connected to the second conveyor 230 such that the actuator 450 can be used to cease and subsequently recommence movement of the second conveyor 230. As shown in FIG. 11, the actuator 450 may be operatively connected to the first conveyor 100 and/or soil delivery system 200 by virtue of being operatively connected to the controller 420, which, in turn, is operatively connected to the first conveyor 100 and/or soil delivery system 200. The actuator 450 may be engaged by a user to transmit a signal to the controller 420. As shown best in FIG. 2, in some embodiments, the actuator 450 may be a pedal that is operatively connected to the controller 420 via electrical wiring 430 and that is configured to transmit an electrical signal to the controller 420 when stepped on by a user. In an embodiment, the controller 420 may be programmed to carry out certain actions in response to receiving signals from the actuator 450.

FIG. 12 shows a method 700 for selectively filling pots 450 by controlling various components of the potting apparatus 10 via user-engagement with the actuator 450. In step 710, a user may engage the actuator 450, while the first conveyor 100 is moving, to direct a first electrical signal to the controller 420. In response to the first signal, the controller 420 may direct the first conveyor's 100 motor 410 to stop movement of the first conveyor 100. As such, step 710 may be carried out to stop a pot 50 loaded onto a moving first conveyor 100 under the discharge area 210 of the soil delivery system. In step 720, the user may engage the actuator 450 again to transmit a second signal to the controller 420. In response to the second signal, the controller 420 may direct the motor 240 responsible for driving movement of the second conveyor 230 to commence movement of the second conveyor 230 to drive soil towards the discharge area 210 for delivery into a pot 50 disposed on the first conveyor 100. In some embodiments, steps 710 and 720 may occur simultaneously. In such embodiments, only a single signal is transmitted to the controller 240 to effectuate stopping of the first conveyor 100 and movement of the second conveyor 230. Once a desired amount of soil is delivered to the pot 50 in step 720, the user may subsequently engage the actuator 450 in step 730 to transmit a third signal to controller 240. In response to third signal, the controller 420 may direct the motor 240 to cease movement of the second conveyor 230, thereby ceasing delivery of soil to the pot 50 disposed on the first conveyor 100. In step 740, the user may engage the actuator 450 again to transmit a fourth signal to the controller 420. In response to the fourth signal, the controller may direct the first conveyor's 100 motor 240 to recommence movement of the first conveyor 100 to drive the filled pot 50 toward the second end 100B of the conveyor and an empty pot 50 towards the discharge area 210 of the soil delivery system 200. In some embodiments, steps 730 and 740 may occur simultaneously. In such embodiments, only a single signal is transmitted to the controller 420 to effectuate stoppage of the second conveyor 230 and recommence movement of the first conveyor 100. Accordingly, in some embodiments, execution of steps 710-740 may result in only two electrical signals being transmitted from the actuator 450 to the controller 420. Steps 710-740 may be repeated to selectively fill a plurality of pots 50.

The foregoing description of the specified embodiments will so fully reveal the general nature of the invention so that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments based on the teaching and guidance presented herein. It is to be understood that phraseology or terminology herein is for the purpose of description and not for limitation, such that the terminology or phraseology of the present specification is to be interpreted by the skilled artisan in light of the teachings and guidance.

What is claimed is:
1. A potting apparatus comprising:
a first conveyor suitable for receiving a pot thereon;
a soil delivery system including a second conveyor for receiving and dispensing soil, the soil delivery system being positioned relative to the first conveyor such that soil dispensed from the second conveyor is directed onto the first conveyor during operation;
a drill system rotatably hinged to the soil delivery system such that the drill system is operable to pivot between a first position wherein the drill system is disposed in a first vertical plane above the first conveyor and a second position in a second vertical plane wherein the drill system is not disposed above the first conveyor, the drill system having a drill bit that is movable upwardly and downwardly relative to the first conveyor when the drill system is in the first position; and a drive system operatively connected to the first conveyor for moving the first conveyor.

2. The potting apparatus of claim 1, wherein the first conveyor is of a first width, and wherein a portion of the soil delivery system extends transversely over the first conveyor, the portion defining a second width smaller than the first width.

3. The potting apparatus of claim 2, wherein the second width is equal to half or less than half of the first width.

4. The potting apparatus of claim 2, wherein the soil delivery system includes a discharge chute disposed adjacent to an end of the second conveyor and the portion is at least partially defined by the discharge chute.

5. The potting apparatus of claim 1, wherein the soil delivery system does not extend transversely across the entirety of a transverse width of the first conveyor.

6. The potting apparatus of claim 1, wherein the drive system is adapted to move the conveyor in an indexing manner such that the first conveyor temporarily stops at a location directly below the drill bit when the drill system is in the first position.

7. The potting apparatus of claim 1, further comprising a pedal actuator operatively connected to at least one of the first conveyor and the soil delivery system.

8. The potting apparatus of claim 1, further comprising an actuator operatively connected to the first conveyor, wherein the actuator can be used to cease movement of the first conveyor and can also be used to commence movement of the first conveyor.

9. The potting apparatus of claim 1, wherein the potting apparatus further comprises an actuator operatively connected to the second conveyor, wherein the actuator can be used to cease movement of the first conveyor and can also be used to commence movement of the second conveyor.

10. The potting apparatus of claim 1, wherein the soil delivery system further includes a bin for collecting soil disposed forwardly of the second conveyor and beneath the first conveyor and an auger for directing soil within the bin to the second conveyor, the bin having an opening to permit passage of soil from the bin to the second conveyor.

11. The potting apparatus of claim 1, wherein the drill system is slidably secured to a plurality of support shafts, wherein the plurality of support shafts includes at least one support shaft located along a first vertical plane and at least one support shaft located along a second vertical plane positioned rearward of the first vertical plane.

12. The potting apparatus of claim 1, wherein the second conveyor includes a plurality of shafts and the soil delivery system further includes a housing, wherein at least one shaft of the plurality of shafts is movably secured to the housing for tensioning the second conveyor.

13. The potting apparatus of claim 1, wherein the first conveyor has a loading end and a discharge end downstream of the loading end, wherein no portion of the apparatus obstructs airspace directly above substantially all of a transverse width of the first conveyor at any point along the first conveyor between the loading end and the discharge end.

14. A potting apparatus comprising:
a first conveyor suitable for receiving a pot thereon;
a soil delivery system including a second conveyor for receiving and dispensing soil, the soil delivery system being positioned relative to the first conveyor such that soil dispensed from the second conveyor is directed onto the first conveyor during operation;
a drill system rotatably hinged to the soil delivery system such that the drill system is operable to pivot between a first position wherein the drill system is disposed in a first vertical plane above the first conveyor and a second position in a second vertical plane wherein the drill system is not disposed above the first conveyor, the drill system having a drill bit that is movable upwardly and downwardly relative to the first conveyor when the drill system is in the first position; and
a drive system operatively connected to the first conveyor and adapted to move the first conveyor in an indexing manner.

15. The potting apparatus of claim 14, wherein a portion of the soil delivery system extends transversely over the first conveyor, wherein the first conveyor is of a first width, and wherein the portion defines a second width smaller than the first width.

16. The potting apparatus of claim 15, wherein the portion does not include the second conveyor.

17. A potting apparatus comprising:
a first conveyor suitable for receiving a pot thereon;
a soil delivery system including a second conveyor for receiving and dispensing soil, the soil delivery system being positioned relative to the first conveyor such that soil dispensed from the second conveyor is directed onto the first conveyor during operation;
a drill apparatus including a drill bit, wherein the drill apparatus is slidably secured to a plurality of support shafts such that the drill apparatus is capable of sliding along a longitudinal length of each of the plurality of support shafts, wherein the plurality of support shafts includes at least one support shaft located along a first vertical plane and at least one support shaft located along a second vertical plane positioned rearward of the first vertical plane;
wherein the drill apparatus is rotatably hinged to pivot about the soil delivery system;
a drill drive system operatively connected to the drill apparatus and configured to slidably move the drill apparatus upwardly and downwardly along the longitudinal length of each of the plurality of support shafts; and
a conveyor drive system operatively connected to the first conveyor for moving the first conveyor.

18. The potting apparatus of claim 17, wherein the drill drive system includes a motor and a belt, wherein the belt is driven by the motor and connected to the drill apparatus such that movement of the belt results in vertical movement of the drill apparatus.

19. The potting apparatus of claim 18, wherein the drill apparatus further includes a support arm adapted to carry the drill apparatus and a bracket slidably secured to the plurality of support shafts such that the bracket is capable of sliding along the longitudinal length of each of the plurality of support shafts, wherein the bracket indirectly connects the support arm to the belt.

20. The potting apparatus of claim 17, wherein the plurality of support shafts comprises two support shafts located along the first vertical plane and one support shaft located along the second vertical plane.

* * * * *